UNITED STATES PATENT OFFICE.

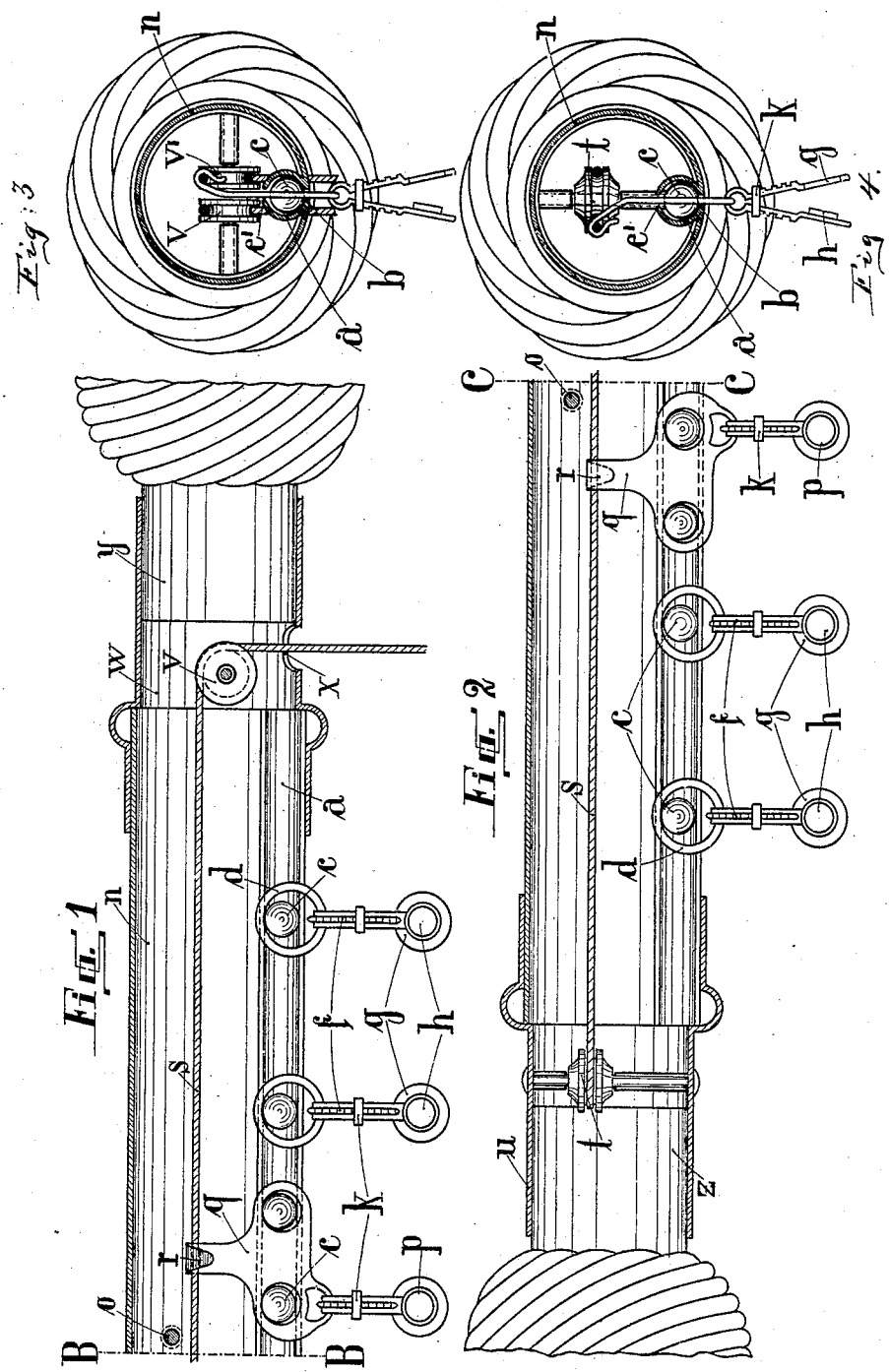

THOMAS LUDWIG, OF BARMEN, GERMANY.

SUSPENSION DEVICE FOR CURTAINS, &c.

No. 863,618.     Specification of Letters Patent.     Patented Aug. 20, 1907.

Original application filed September 7, 1906, Serial No. 333,631. Divided and this application filed March 5, 1907. Serial No. 360,780.

*To all whom it may concern:*

Be it known that I, THOMAS LUDWIG, a citizen of Germany, residing at Barmen, Germany, have invented new and useful Improvements in Suspension Devices for Curtains and Similar Articles, of which the following is a specification.

This invention relates to an improved supporting rod for curtains and similar articles, the present application being a division of an application filed by me September 7, 1906, under Serial No. 333,631.

In the accompanying drawing: Figure 1 is a longitudinal section through the right hand end of my improved suspension device; Fig. 2 a similar section through the left hand end thereof; Fig. 3 a cross section on line B—B, Fig. 1, and Fig. 4 a similar section on line C—C, Fig. 2.

A tube $a$, is inclosed within a tube $n$, of larger diameter, upon the bottom of which it is supported, so that in this way the tubes are eccentric to each other. Tube $a$, is at its top provided with a slot $e'$, and at its bottom with a diametrically opposite slot $v$, such lower slot registering with a corresponding lower slot of tube $n$. Balls $c$, are freely movable within tube $a$, the tube thus constituting a ball race. Balls $c$, are embraced by rings $d$, which pass partly through slot $e'$, into tube $n$, and partly out through slot $b$, so as to be guided within the slots. From rings $d$, are suspended the curtain holders $f$, to which the curtains may be secured by means of clasps $g$, $h$. The parts $a$, $n$, may be rolled or drawn in a single piece, and in order to prevent sagging of tube $n$, it may be provided with transverse braces $o$.

The end hooks $p$, of the curtain, which is here supposed to be in two parts, are connected with carriages formed of two balls $c$, coupled by being arranged in a yoke plate $q$, the clip $r$, of each of these carriages, which extends inside the tube $n$, being fixed to one length of the cord $s$. This cord $s$, is carried over a roller $t$, mounted in one end $u$, of the rod, while its free ends pass over the two guide rollers $v$, and $v'$, in the end $w$, of the rod, out of which they pass through an opening $x$. The heads or end-pieces $u$, and $w$, may of course be given any desired form or ornamentation externally, by fitting them to the ends of the rod by means of their sockets $z$, and $y$, they serve at the same time for holding them together. The rod arranged in the manner described, may be fixed in position with the cord arranged ready for use, so that all that is necessary is to attach the curtain to the holders $f$. By pulling the cord depending from the rod, the curtain may be drawn in either direction.

I claim:

1. A suspension device for curtains and similar articles, comprising an inner tube having a pair of diametrically arranged slots, a slotted outer tube, balls in the inner tube, rings embracing the balls and projecting into the outer tube, and holders secured to the rings, substantially as specified.

2. Supporting rod for longitudinally displaceable suspension devices, consisting of an inner tube having upper and lower slots, balls in the tube, rings embracing the balls, a slotted outer tube, rollers at each end of the outer tube, a rope engaging the rollers, and curtain adjusting means connected to the rope, substantially as specified.

3. Supporting rod for longitudinally displaceable suspension devices, consisting of an inner tube having upper and lower slots, balls in the tube, rings embracing the balls, a slotted outer tube, rollers at each end of the outer tube, a rope engaging the rollers, and a yoke connecting two of the balls and engaged by the rope, substantially as specified.

Signed by me at Barmen, Germany, this 6th day of February 1907.

THOMAS LUDWIG. [L. S.]

Witnesses:
   OTTO KÖNIG,
   J. A. RITTERSHAUS.